United States Patent [19]
Danno et al.

[11] Patent Number: 5,150,300
[45] Date of Patent: Sep. 22, 1992

[54] IGNITION TIMING CONTROLLER FOR SPARK-IGNITION INTERNAL COMBUSTION ENGINE USING ESTIMATED CYLINDER WALL TEMPERATURE

[75] Inventors: Yoshiaki Danno, Kyoto; Kazuhide Togai, Osaka; Hiromitsu Ando, Aichi; Jun Takemura, Aichi; Eiichi Koujina, Aichi; Ichiyo Kojima, Kyoto, all of Japan

[73] Assignee: Mitsubishi Jidosha Kogyo K.K., Japan

[21] Appl. No.: 742,525

[22] Filed: Aug. 7, 1991

Related U.S. Application Data

[63] Continuation of Ser. No. 483,504, Feb. 23, 1990, abandoned.

[30] Foreign Application Priority Data

Feb. 23, 1989 [JP] Japan .................................. 1-44162

[51] Int. Cl.⁵ .............................. F02P 5/14; F02P 5/00
[52] U.S. Cl. ................................ 364/431.03; 123/406; 123/425; 364/431.01
[58] Field of Search .................... 364/431.03, 431.04, 364/431.07, 431.08, 431.01; 123/421, 406, 425, 418, 435

[56] References Cited

U.S. PATENT DOCUMENTS

| | | | |
|---|---|---|---|
| 4,424,783 | 1/1984 | Kotwicki | 123/421 X |
| 4,466,408 | 8/1984 | Cheklich | 123/425 |
| 4,622,939 | 11/1986 | Matekunas | 123/425 |
| 4,658,785 | 4/1987 | Naganawa et al. | 123/418 X |
| 4,905,648 | 3/1990 | Washino et al. | 364/431.08 X |

Primary Examiner—Parshotam S. Lall
Assistant Examiner—Edward Pipala
Attorney, Agent, or Firm—Wegner, Cantor, Mueller & Player

[57] ABSTRACT

An ignition timing controller is furnished for use in a spark-ignition internal combustion engine. The controller includes a device for setting the ignition timing of the engine in accordance with the state of operation of the engine and another device for actuating an ignition system on the basis of the ignition timing set by the ignition timing setting device. The ignition timing setting device is constructed of a device for estimating the wall temperature of a combustion chamber of the engine from a variable, which indicates the quantity of combustion energy of the engine, and another device for calculating the ignition timing from the wall temperature of the combustion chamber estimated by the wall temperature estimating device.

20 Claims, 4 Drawing Sheets

IGNITION TIMING CONTROLLER FOR SPARK-IGNITION INTERNAL COMBUSTION ENGINE USING ESTIMATED CYLINDER WALL TEMPERATURE

This application is a continuation of U.S. application Ser. No. 07/483,504, filed Feb. 23, 1990 now abandoned.

BACKGROUND OF THE INVENTION

1. Field of the Invention

The present invention relates to an ignition timing controller suitable for use in a spark-ignition internal combustion engine, such as a gasoline engine, which may hereinafter be called merely the "engine".

2. Description of the Related Art

Control of the ignition timing of a gasoline engine has conventionally been conducted, for example, in the following manner. The ignition timing of the engine is controlled by determining the state of operation of the engine with a flow rate sensor adapted to detect the volume of intake air to the engine (a pressure sensor for detecting the pressure in an intake passage may be used instead of the pressure sensor) and an engine revolution number sensor adapted to detect the revolution number of the engine; determining, based on the state of operation determined from detection results by these sensors, basic ignition timing information in accordance with a two-dimensional map containing volumetric efficiencies $E_v$ (A/N) obtained by dividing the volumes A of intake air with engine revolution numbers N or advance values (information on ignition timing) determined from pressures of the intake passage and engine revolution numbers N; applying a suitable correction to the basic ignition timing information; and then actuating an ignition system, which generally includes a spark plug and an ignition coil, on the basis of the thus-obtained ignition timing information.

The above-described suitable correction to the basic ignition timing information includes a correction applied based on the coolant temperature of the engine, a correction effected in accordance with the intake air temperature, or the like. Since knock (knocking) occurs especially upon acceleration of the engine, it is also necessary to apply a certain correction to the ignition timing information upon acceleration of the engine.

Here, engine knock is an oscillation phenomenon in a combustion chamber, which is inducted by autoignition. Such knock produces an unpleasant noise and moreover, has a potential danger that it may adversely affect the engine.

With a view toward avoiding the occurrence of such knock, control has heretofore been performed to retard the ignition timing in general. In this case, it is difficult to detect any engine phenomenon which may lead to the occurrence of knock. Accordingly, a control method is adopted to retard the ignition timing to a safe side such that knock is not caused to occur even under worst conditions.

SUMMARY OF THE INVENTION

Incidentally, the ignition angle which causes knocking is related to the temperature of a wall portion of a combustion chamber (the wall temperature of the combustion chamber). When the engine load changes from a low level to a high level upon acceleration, the wall temperature of the combustion chamber is lower than the wall temperature of the combustion chamber at the time of steady-state operation due to a lag in the temperature rise as shown in FIG. 5. Therefore, knocking does not occur for several tens cycles until the wall temperature of the combustion chamber rises to the temperature level at the time of steady-state operation even when the ignition timing is advanced relative to the standard ignition timing.

The present invention has been completed on the basis of the above finding. An object of the present invention is therefore to provide an ignition timing controller for a spark-ignition internal combustion engine, which allows to obtain ignition timing information on the basis of the wall temperature of a combustion chamber and hence permits improvements to the output and efficiency of the engine and further to the acceleration performance without avoiding any unduly retardation of the ignition timing beyond necessity.

In one aspect of the present invention, there is thus provided an ignition timing controller for a spark-ignition internal combustion engine. The controller has a means for setting the ignition timing of the engine in accordance with the state of operation of the engine and a means for actuating an ignition system on the basis of the ignition timing set by the ignition timing setting means. The ignition timing setting means comprises a means for estimating the wall temperature of a combustion chamber of the engine from a variable which indicates the quantity of combustion energy of the engine; and a means for calculating the ignition timing from the wall temperature of the combustion chamber estimated by the wall temperature estimating means.

In another aspect of the present invention, there is also provided an ignition timing controller for a spark-ignition internal combustion engine. The controller has a means for setting the ignition timing of the engine in accordance with the state of operation of the engine and a means for actuating an ignition system on the basis of the ignition timing set by the ignition timing setting means. The ignition timing setting means comprises a means for setting basic ignition timing for steady-state operation in accordance with engine revolution number and engine load, a means for calculating, from a variable indicative of the quantity of combustion energy of the engine, a computing parameter having a correlation with the wall temperature of the combustion chamber of the engine, and a means for calculating a correction value for the ignition timing from the computing parameter calculated by the computing parameter calculating means. Upon transitional operation of the engine, the basic ignition timing obtained by the basic ignition timing setting means is corrected by the ignition timing correction value determined by the ignition timing correction value calculating means on the basis of the computing parameter which has been calculated by the computing parameter calculating means.

According to the ignition timing controller of the present invention suitable for use in the spark-ignition internal combustion engine, the ignition system is actuated on the basis of the ignition timing information set by the ignition timing setting means. Here, the ignition timing is determined in the following manner. Namely, the wall temperature of the combustion chamber of the internal combustion engine is first estimated from the variable, which indicates the quantity of combustion energy of the engine, by the combustion chamber wall temperature estimating means. As an alternative, the computing parameter having the correlation with the room temperature of the combustion chamber is calculated by the computing parameter calculating means. Next, the ignition timing is determined from the estimated wall temperature of the combustion chamber or the computing parameter by the ignition timing calculating means. The present invention can therefore bring about the advantage that the engine output and efficiency and the acceleration performance can all be improved without unduly retarding the ignition timing beyond necessity.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
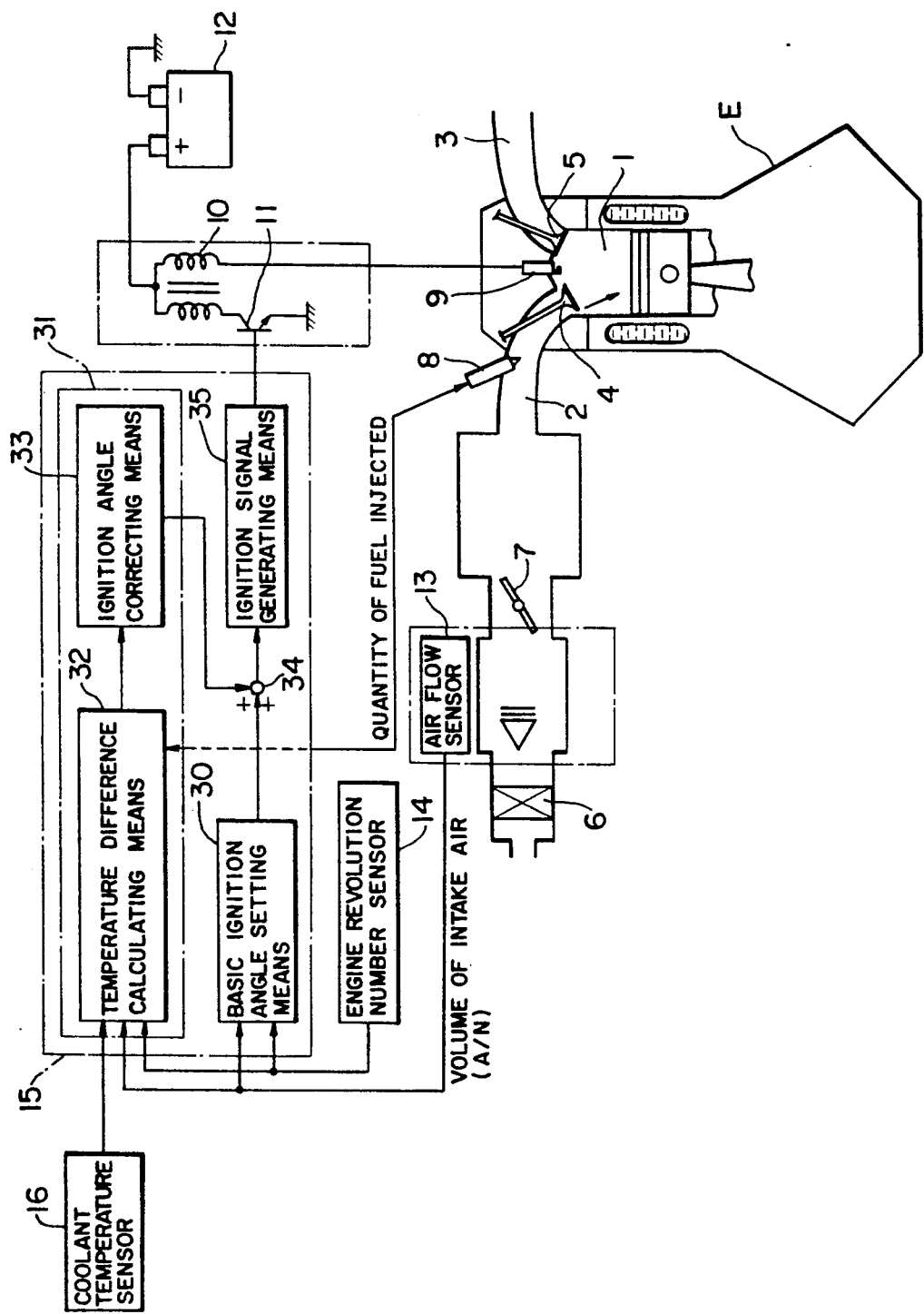
FIG. 1 is a simplified overall block diagram showing the control system of an ignition timing controller according to one embodiment of the present invention and an associated spark-ignition internal combustion engine.
Figure 2:
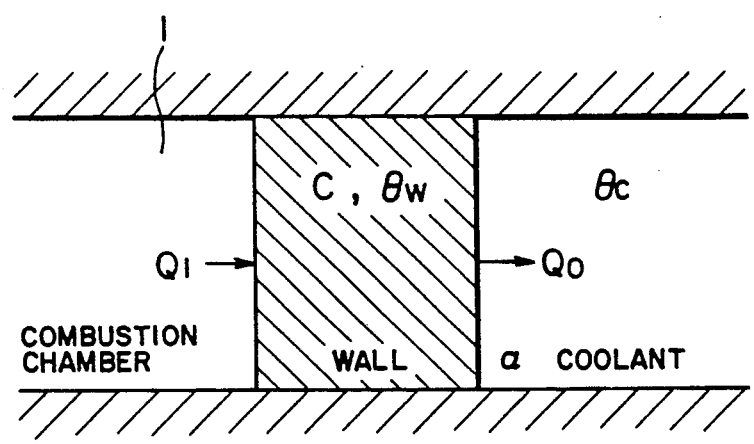
FIG. 2 illustrates an estimation model for the wall temperature of a combustion chamber.
Figure 3:
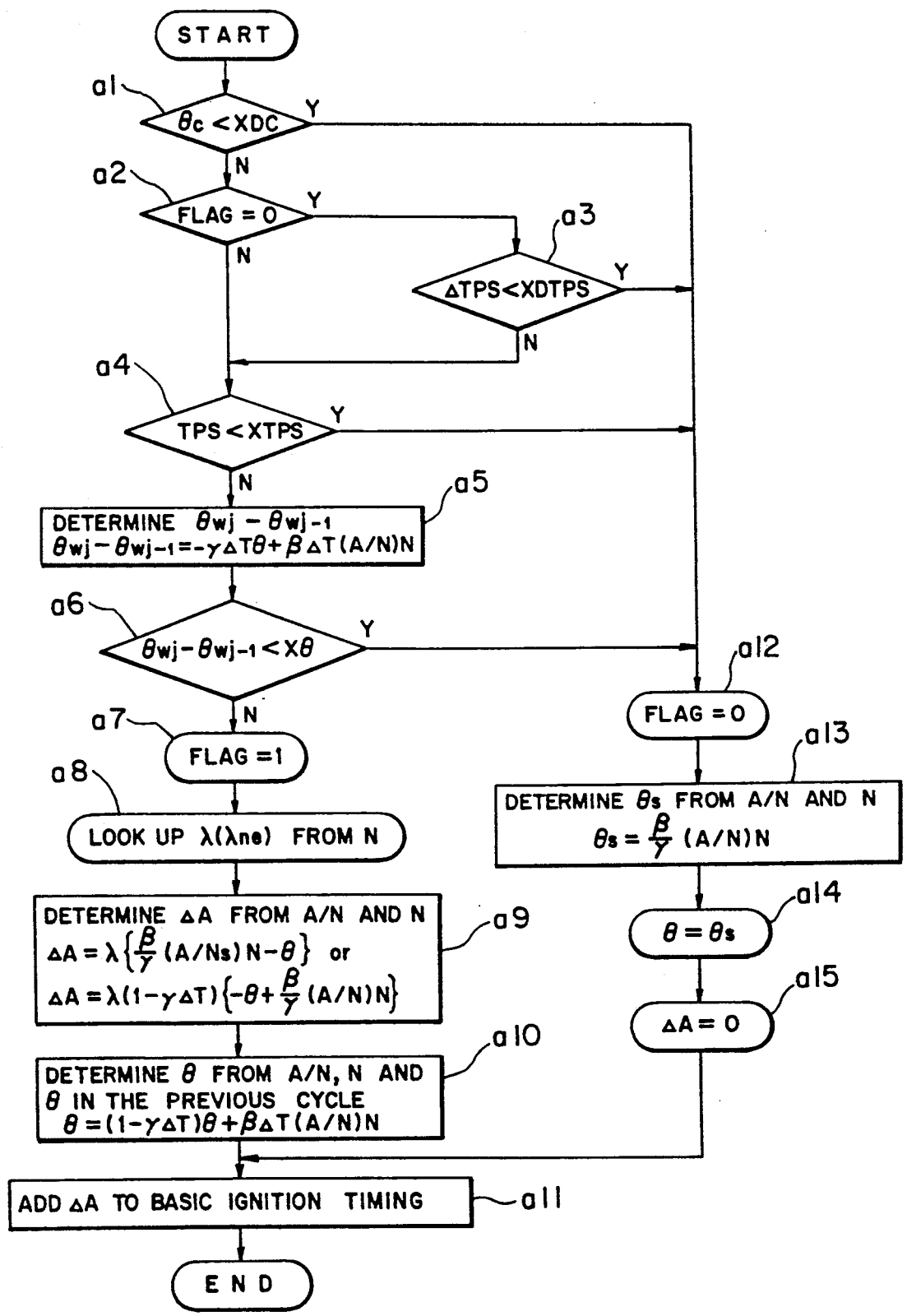
FIG. 3 is a flow chart for determining the ignition timing.
Figure 4:
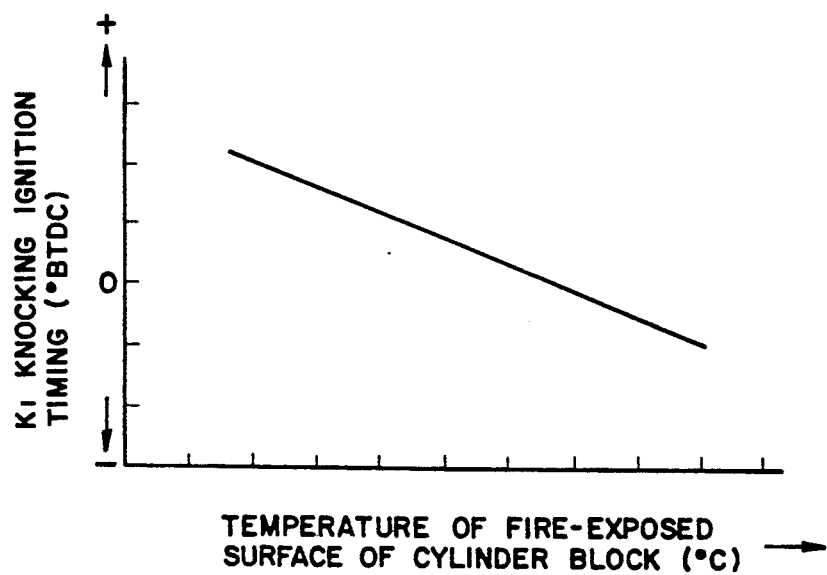
FIG. 4 is a diagram showing knock characteristics as a function of the temperature of a fire-exposed surface of a cylinder block (the wall temperature of the combustion chamber) during full opening of an associated throttle valve.
Figure 5:
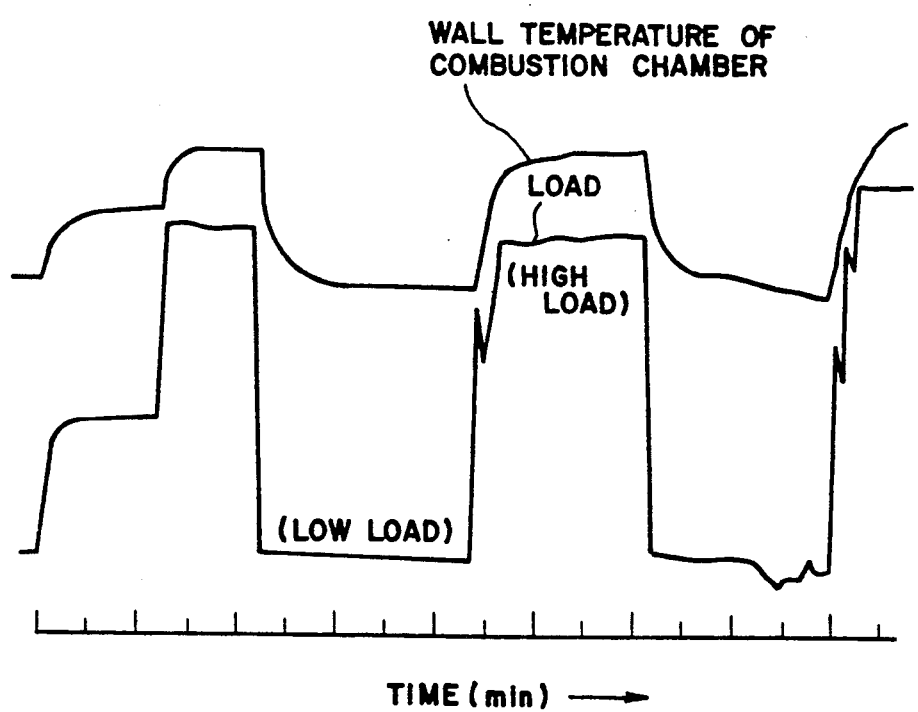
FIG. 5 is a characteristic diagram illustrating the state of response of the wall temperature of the combustion chamber when the engine revolution number changes rapidly.

The ignition timing controller according to one embodiment of the present invention will now be described with reference to FIGS. 1 to 3. A vehicle gasoline engine system (spark-ignition internal combustion engine system) can be illustrated as depicted in FIG. 1. In the drawing, a gasoline engine E (hereinafter referred to merely as the "engine E") has an intake passage 2 and an exhaust passage 3, which are operatively communicated with a combustion chamber 1. The intake passage 2 and the combustion chamber 1 are communicated under control by an intake valve 4, while the exhaust passage 3 and the combustion chamber 1 are communicated under control by an exhaust valve 5.

Further, the intake passage 2 is provided with an air cleaner 6, throttle valve 7 and electromagnetic fuel injection valve (injector) 8 successively in order from the upstream side. The exhaust passage 3 is provided with an exhaust-gas-cleaning catalytic converter (three-way catalyst) and muffler successively in order from the upstream side although they are not shown in the drawing.

Incidentally, injectors including the injector 8 is provided as many as cylinders at an intake manifold. Assume the engine E in the present embodiment is an in-line 4 cylinder engine. Then, four injectors 8 are provided. Namely, the engine E can be said as a multipoint fuel injection (MPI) engine.

A throttle valve 7 is connected to an accelerator pedal by way of a wire cable, whereby the opening rate of the throttle valve 7 varies depending on the degree of depression of the accelerator pedal.

Each cylinder is provided with a spark plug 9 which projects in the combustion chamber 1. Each spark plug 9 is connected to an ignition coil 10 via a distributor (not shown). When a power transistor 11 associated with the ignition coil is turned off, a high voltage is induced in the ignition coil 10 so that one of spark plugs, including the spark plug 9, connected to the distributor is caused to produce a spark. Upon turning on of the power transistor 11, the charging of the ignition coil 10 by a battery 12 is initiated. An ignition system is constructed by these ignition plugs 9, distributor, ignition coil 10 and power transistor 11.

Owing to the construction described above, air aspirated in accordance with the opening rate of the throttle valve 7 through the air cleaner 6 is mixed with the fuel from the injector 8 in the intake manifold to give a suitable air/fuel ratio. The resulting air-fuel mixture is then ignited at suitable timing by the spark plug 9 in the combustion chamber 1, whereby the mixture is caused to burn so that an engine torque is produced. The resultant gaseous mixture is then discharged as exhaust gas into the exhaust passage 3. After three noxious components of CO, $C_mH_n$ and $NO_x$ are removed by the catalytic converter from the exhaust, the thus-purified exhaust gas is noise-deadened through a muffler and is then released into the atmosphere.

Various sensors are also provided to control the engine E. Provided in an air-cleaner-disposed portion on the side of the intake passage 2 are an air flow sensor 13 as a volumetric flow meter for detecting the volume of intake air from Karman vortex information, an intake air temperature sensor for detecting the temperature of intake air and an atmospheric pressure sensor for detecting the atmospheric pressure. In a throttle-valve-arranged portion on the side of the intake passage 2, there are provided a throttle sensor of the potentiometer type for detecting the opening rate of the throttle valve 7 and an idle switch for detecting the state of idling.

In addition, on the side of the exhaust passage 3, an oxygen concentration sensor ($O_2$ sensor) for detecting the oxygen concentration ($O_2$ concentration) in exhaust gas is provided at a location which is on the upstream side of the catalytic converter and is close to the combustion chamber 1.

A coolant temperature sensor 16 is also provided to detect the temperature of the engine coolant. The distributor is provided with a crank angle sensor 14 for detecting the crank angle and a TDC sensor for detecting the top dead center of the first cylinder (the base cylinder). The crank angle sensor 14 may hereinafter be called the "engine revolution number sensor" as needed, because the crank angle sensor 14 also serves as a sensor for detecting the engine revolution number N.

Detection signals from the individual sensors are inputted to an electronic control unit (ECU) 15.

Describing ECU 15 in terms of hardware, ECU 15 is provided with CPU, RAM (including backup RAM), ROM and an appropriate I/O interface. Signals from the individual sensors are inputted to CPU through the input interface or directly and ignition timing control signals are outputted from CPU to the power transistor 11 by way of the output interface. The individual spark plugs 9 are then successively sparked by voltages fed from the ignition coils via the distributor.

In addition, a fuel injection control signal is outputted from CPU to each injectors 8 through the output interface, whereby the injector 8 is controlled to inject the fuel for a time period, which is determined by the fuel injection control signal, and to give a desired air/fuel ratio.

Now, paying attention to the control of the ignition timing, ECU 15 will be described using a function block adapted to perform such control of the ignition timing. The function block can be illustrated as shown in FIG. 1. Namely, the ignition timing controller has a basic ignition angle setting means 30 as the basic ignition timing setting means, an ignition timing correction value setting means 31, an adder means 34, and an ignition signal generating means 35.

Here, the basic ignition angle setting means 30 serves to set the basic ignition timing in accordance with the state of operation of the engine E. This state of operation is determined based on information on the engine load from the air flow sensor 13 and information on the engine revolution number from the engine revolution number sensor 14. For example, the basic ignition angle setting means 30 has a basic ignition timing map which stores two-dimensional basic ignition timing data (advance data) $\theta_o$ determined from A/N and N.

The ignition timing correction value setting means 31 is constructed of a temperature difference calculating means (computing parameter calculating means) 32 and an ignition angle correcting means 33 as the ignition timing correction value calculating means. The temperature difference calculating means is adapted to calculate, as a computing parameter having a correlation with the wall temperature of the combustion chamber 1 of the engine E, the difference between the wall temperature of the combustion chamber 1 and the coolant temperature from a variable (e.g., the volume of intake air or the injection quantity of fuel) which is indicative of the quantity of combustion energy. The ignition angle correcting means 33 is adapted to determine the ignition timing correction value $\Delta A$ from information on the difference between the wall temperature of the combustion chamber and the coolant temperature, said temperature difference having been determined by the temperature difference calculating means 32.

The adder means 34 serves to add the basic ignition angle $\theta_o$ from the basic ignition angle setting means 30 with the ignition timing correction value $\Delta A$ from the ignition timing correction value setting means 31.

Accordingly, these basic ignition angle setting means 30, ignition timing correction value setting means 31 and adder means 34 constitute in combination the means for setting the ignition timing in accordance with the state of operation of the engine E.

On the basis of the sum of the basic ignition angle $\theta o$ and the ignition timing correction value $\Delta A$ from the adder means 34, the ignition signal generating means 35 generates an ignition signal to actuate the power transistor 11. Accordingly, the ignition signal generating means 35 constitutes the ignition system actuating means which actuates the ignition system such as the power transistor 11 on the basis of information on the ignition timing determined in accordance with the state of operation of the engine.

A description will next be made of a method which is suitable in calculating the difference between the wall temperature of the combustion chamber and the coolant temperature by the temperature difference calculating means 32 as well as a method which is useful in determining the ignition timing correction value $\Delta A$ by the ignition angle correcting means 33.

An estimation model for the wall temperature of the combustion chamber and its calculation formula will be described first of all. As shown in FIG. 2, the model for the estimation of the wall temperature $\theta w$ is considered to be an unsteady dimensionless model which can be estimated from heat quantities $Q_i, Q_o$ inputted and outputted through the wall of the combustion chamber, the heat capacity C of the wall of the combustion chamber and the coolant temperature $\theta_c$. From this model, the temperature increment $\theta_w$ of the wall of the combustion chamber is expressed by the following formula:

$$\theta_w = (Q_i - Q_o)/C \quad (1)$$

$Q_o$ is in turn defined by the following formula:

$$Q_o = \alpha(\theta_w - \theta_c) \quad (2)$$

where
$\alpha$: overall heat transmission coefficient between the wall of the combustion chamber and the coolant.
By introducing the formula (1) into the formula (2), the following formula is derived:

$$\theta_w = -\{\alpha(\theta_w - \theta_c)C\} + (Q_i/C) \quad (3)$$

Here, assume $$\theta_w = \theta_c + \theta \quad (4)$$

($\theta$: the temperature difference between the wall of the combustion chamber and the coolant). Because of $d\theta_c/dt = 0$, the formula (3) can then be rewritten as follows:

$$\theta = (-\alpha\theta/C) + (Q_i/C) \quad (5)$$

Also assume that the exothermic energy of the fuel is in proportion with the product of the flow rate A/N of air aspirated into the cylinder per revolution of the engine and the revolution number N of the engine, the heat quantity $Q_i$ flowing in the wall of the combustion chamber is a portion of the exothermic energy and the proportion of the portion is constant. $Q_i$ then becomes to be in a linear relation with $(A/N) \times B$, If we define $$Q_i = C\beta(A/N)N (\beta:\text{constant}) \quad (6)$$

and rewrite $\alpha/C$ by $\gamma$(constant), then the formula (5) is $$\theta = -\gamma\theta + \beta(A/N)N \quad (7)$$

Integrating $\theta$ from a time t to another time $(t + \Delta T)$, $$\theta_{(t+\Delta T)} = \theta_{(t)} + (-\gamma\theta + \beta(A/N)N)dt \quad (8)$$

where the subscript (t) expresses the value at the time t. By approximating the formula (8) by the Euler method in which $\Delta T$ is assumed to be a constant interval, the following formula is derived:

$$\theta_{(t+\Delta T)} = \theta_{(t)} + [-\gamma\theta_{(t)} + \beta\{A/N_{(t)}\}N_{(t)}]\Delta T = (1 - \gamma\Delta T)\theta_{(t)} \quad (9)$$
$$+ \beta\{A/N_{(t)}\}N_{(t)}\Delta T$$

or $$\theta_{(t+\Delta T)} = (1 - \gamma\Delta T)\theta_{(t)} + \beta\{A/N_{(t+\Delta T)}\}N_{(t+\Delta T)}\Delta T$$

When rewritten into a calculation formula for each computation cycle ΔT, $$\theta_j = (1 - \gamma \Delta T)\theta_{j-1} + \beta \Delta T\{A/N_j\}N_j \quad (10)$$

where
j: value in the $j^{th}$ computation.

The formula (10) can be computed by an engine control microcomputer because it is a recurrence formula. The wall temperature of the combustion chamber can therefore be determined by the formulae (4) and (10) provided that Γ and β have been measured in advance.

A description will next be made of a method for calculating the ignition angle correction value (ignition timing correction value) ΔA from the temperature difference θ between the wall of the combustion chamber and the coolant.

Namely, the ignition timing can be obtained from the wall temperature of the combustion chamber provided that the relations of combustion chamber wall temperatures and K1 knocking ignition timing with engine revolution numbers N, intake air volumes A/C per revolution of the engine and coolant temperatures are determined empirically and stored in the engine control microcomputer.

Assume first that K1 knocking ignition timing $A_{K1}$ upon WOT (wholly opening of the throttle valve) can be expressed in terms $\theta_w$ by a first order formula for different engine revolution numbers N and coolant temperatures. Then, the following formula is established:

$$A_{K1} = \lambda \theta_w + \mu \quad (11)$$

where
λ,μ: constants determined by engine revolution number and coolant temperature.

Using the wall temperature $\theta_s$ of the combustion chamber during steady-state WOT, a correction advance angle ΔA (°BTDC) can be given by $$\Delta A = \lambda(\theta_{ws} - \theta_w) \quad (12)$$

From the formula (4), the formula (12) can be rewritten to $$\Delta A = \lambda(\theta_s - \theta) \quad (13)$$

where
$\theta_s$: temperature difference between the wall of the combustion chamber and the coolant during steady-state WOT.

Here, from the volume $A/N_s$ of intake air per engine revolution number during steady-state WOT at the engine revolution number N, $\theta_s$ at this time can be determined by assuming $\theta(t+\Delta T) = \theta_{(t)}$. $\theta_s$ can therefore be rewritten to $$\theta_s = (\beta/\gamma)(A/N_s)N \quad (14)$$

Therefore, the formula (13) can be rewritten to $$\Delta A = \lambda[\{(\beta/\gamma)(A/N_s)N\} - \theta] \quad (15)$$

The correction advance angle in the $j^{th}$ computation can be expressed by the following formula:

$$\Delta A_j = \lambda[\{(\beta/\gamma)(A/N_s)N_j\} - \theta_j] \quad (16)$$

Therefore, by storing a map of λ, $A/N_s$ and coolant temperatures in the engine control microcomputer, ΔA at the time of a given computation cycle can be calculated from λ, $A/N_s$ and N in the cycle and θ determined in accordance with the formula (10). The actual ignition angle is however set by adding a certain degree of margin to ΔA.

For different A/N rather than WOT, the following formula can be established:

$$\Delta A_j = \lambda_{ne}(1 - \gamma \Delta T)\{-\theta_{j-1} + (\beta/\gamma)(A/N_j)N_j\} \quad (17)$$

The manner of computation of ignition timing will next be described with reference to the flow chart of FIG. 3.

First of all, it is judged in step a1 whether the coolant temperature $\theta_c$ is smaller than a preset value XDC. If smaller, the routine advances through NO route to step a2, where it is judged whether flag FLG is 0 or not. Assume flag FLG is 0 at the beginning. Then, the routine proceeds through YES route and in step a3, a judgment is made on whether the rate of change in the throttle opening rate ΔTPS is smaller than a preset value XDTPS. If greater, namely, at the time of acceleration, NO route is taken after step a3, and it is judged in step a4 whether the throttle opening rate TPS is smaller than a preset value XTPS. A value close to the opening rate of the throttle valve in the wholly opened position is chosen as the preset value XTPS. If not, namely, if the throttle opening rate TPS is either equal or close to the opening rate of the throttle valve in the wholly opened position, NO route is taken after step a4 and in step a5, the rate of change $\theta w_j - \theta w_{j-1}$ of the wall temperature of the combustion chamber is determined.

In the next step a6, it is judged whether the rate of change $\theta_{wj} - \theta_{wj-1}$ of the wall temperature of the combustion chamber is smaller than a preset value $X_{74}$. If the rate of change $\theta_{wj} - \theta_{wj-1}$ of the wall temperature of the combustion chamber is equal to or greater than the preset value $X_\theta$, FLAG=1 is established in step a7. λ, namely, $\lambda_{ne}$ is looked up from the engine revolution number in step a8 and the ignition correction value ΔA is determined in step a9.

Thereafter, the next information on the wall temperature of the combustion chamber is determined in step a10 and ΔA is added to the basic ignition timing $\theta_o$ in step a11.

On the other hand, if the rate of change $\theta_{wj} - \theta_{wj-1}$ of the wall temperature of the combustion chamber is smaller than the preset value $X_\theta$, namely, the operation proceeds to steady-state operation, YES route is taken after step a6. In step a12, FLG=0 is established. The steady-state wall temperature $\theta_s$ of the combustion chamber is determined in step a13. After the next information on the wall temperature of the combustion chamber is set at θs, the ignition correction value ΔA is set at 0 in step a15. Then, ΔA (=0) is added to the basic ignition timing in step a11.

When the coolant temperature is low or the operation is not in acceleration or the opening rate of the throttle value is not close to the opening rate of the throttle valve in the wholly opened position, the routine jumps to step 12 and control for steady state is performed (steps a13–a15).

Once an ignition angle has been determined as described above, ignition signals are outputted from the ignition signal generating means 21 to the power transistor 11 on the basis of the above information and the spark plugs 9 are sparked at the timing corresponding to the ignition signals.

Since the determination of the ignition correction value from the wall temperature of the combustion chamber is carried out as described above, the ignition advance angle is set on the advance side while the wall temperature of the combustion chamber at the time of acceleration is low (during several cycles in the beginning of acceleration). When the wall temperature of the combustion chamber becomes higher after the middle stage of the acceleration, the ignition advance angle can be corrected to the retardation side in accordance with the degree of the temperature rise. This makes it possible to always set the ignition angle at the knock-free optimal ignition angle determined by the wall temperature of the combustion chamber, whereby knocking at the time of acceleration can be prevented without failure while avoiding interference to the prompt acceleration as much as possible. As a result, it is possible to increase the engine output, so that the engine efficiency can be increased and the acceleration performance can be improved substantially.

Incidentally, the correction based on the wall temperature of the combustion chamber is not effected in steady-state operation.

Upon control of the ignition timing, it is also possible to effect a correction in accordance with the coolant temperature or the intake air temperature besides the correction at the time of acceleration.

Instead of constructing the ignition timing calculation means with the basic ignition timing setting means 30 and ignition timing correction value setting means 31 and with the adder means 34 for adding pieces of information obtained by these means, respectively, it is possible to have, for only plural wall temperatures of the combustion chamber, an ignition timing map storing two-dimensional ignition timing data (advance angle data) in which each ignition angle (ignition timing) is determined in accordance of the corresponding state of operation of the engine E.

As the variable indicative of the quantity of combustion energy to be employed upon estimation of the wall temperature of the combustion chamber, namely, upon calculation of the temperature difference between the wall of the combustion chamber and the coolant, the quantity of fuel injected can be used in place of the volume of intake air.

In the embodiment described above, during transitional operation of the engine, the basic ignition timing obtained by the basic ignition timing setting means is corrected by the ignition timing correction value $\Delta A$, which is determined based on the temperature difference between the wall of the combustion chamber and the coolant, as a computing parameter having a correlation with the temperature of the wall of the combustion chamber. It is also possible during transitional operation of the engine to correct the basic ignition timing, which is obtained by the basic ignition timing setting means, by the ignition timing correction value $\Delta A$ determined on the basis of the temperature of the wall of the combustion chamber.

Furthermore, in addition to spark-ignition internal combustion engines of the L-Jetronic system making use of an air flow sensor, the present invention can also be applied to spark-ignition internal combustion engines of the D-Jetronic system (i.e., of the speed density system) which makes use of an intake passage pressure sensor.

In addition to gasoline engines, the present invention can be equally applied to general spark-ignition internal combustion engines such as alcohol engines which use alcohol as fuel.

We claim:

1. An ignition timing controller for a spark-ignition internal combustion engine, said controller comprising:
   means for setting the ignition timing of the engine in accordance with the state of operation of the engine;
   wherein the ignition timing setting means comprises:
   estimating means for estimating and storing at predetermined intervals the wall temperature of a combustion chamber of the engine from a variable which indicates the quantity of combustion energy of the engine, wherein said estimating means corrects a present estimated temperature in accordance with a stored, previous temperature to compensate for a lag in the transfer of heat of combustion to a wall of the combustion chamber, and outputs the thus-corrected, present estimated temperature as a wall temperature of the combustion chamber; and
   calculating means for calculating the ignition timing from the corrected, present estimated wall temperature of the combustion chamber; and
   means for actuating an ignition system on the basis of the ignition timing set by the ignition timing setting means.

2. The controller of claim 1, wherein the ignition timing setting means is provided with a basic ignition timing setting means for setting basic ignition timing for steady-state operation in accordance with engine revolution number and engine load and the ignition timing calculating means is constructed as a means for calculating a correction value for the ignition timing from the corrected, present estimated wall temperature of the combustion chamber, whereby upon transitional operation of the engine, the basic ignition timing obtained by the basic ignition timing setting means is corrected toward an advance side by the ignition timing correction value determined by the ignition timing correction value calculating means on the basis of the corrected, present estimated wall temperature of the combustion chamber.

3. An ignition timing controller for a spark-ignition internal combustion engine, said controller comprising:
   means for setting the ignition timing of the engine in accordance with the state of operation of the engine; and
   means for actuating an ignition system on the basis of the ignition timing set by the ignition timing setting means;
   wherein the ignition timing setting means comprises:
   means for setting basic ignition timing for steady-state operation in accordance with engine revolution number and engine load;
   means for calculating and storing at predetermined intervals, from a variable indicative of the quantity of combustion energy of the engine, a computing parameter having a correlation with the wall temperature of the combustion chamber of the engine and further for correcting a present computing parameter in accordance with a store, previous computing parameter to compensate for a delay in the transfer of heat of combustion to a wall of the combustion chamber; and
   means for calculating a correction value for the ignition timing from the computing parameter calculated and corrected by the computing parameter calculating means;

whereby upon transitional operation of the engine, the basic ignition timing obtained by the basic ignition timing setting means is corrected by the ignition timing correction value determined by the ignition timing correction value calculating means on the basis of the computing parameter which has been calculated by the computing parameter calculating means.

4. The controller of claim 3, wherein the computing parameter calculating means detects at predetermined sampling intervals the quantity of state of an operation parameter having a correlation with combustion energy of the engine and repeatedly determines the computing parameter based on the quantity of state thus detected and, during the transitional operation, the ignition timing correction value calculating means repeatedly determines the ignition timing correction value on the basis of the computing parameter corrected by the computing parameter calculating means so that the ignition timing is advanced.

5. The controller of claim 4, wherein a latest computing parameter is determined from a preceding computing parameter and the quantity of state of the operation parameter determined most recently.

6. The controller of claim 5, wherein an initial value of the computing parameter is set on the basis of the quantity of state of the operation parameter which exists immediately before the transitional operation.

7. The controller of claim 4, wherein the ignition timing correction value is determined from a latest computing parameter estimated by the computing parameter calculating means and the quantity of state of operation parameter detected most recently.

8. The controller of claim 7, wherein a latest ignition timing correction value $\Delta A$ determined by the ignition timing calculating means is expressed by the following formula:

$$\Delta A = \lambda(1-\gamma\Delta T)\{-\theta+(\beta/\gamma)(A/N)N\}$$

in which:
$\theta$: data indicative of the computing parameter, said data corresponding to the difference between the wall temperature of the combustion chamber and the coolant temperature;
N: engine revolution number;
A/N: intake air volume per revolution of the engine, the quantity of state of the operation parameter being determined by the product of A/N and N;
$\Delta T$: computation cycle; and
$\lambda,\beta,\gamma$: constants.

9. The controller of claim 8, wherein the constant $\lambda$ is determined in accordance with at least one of the engine revolution number and the coolant temperature.

10. The controller of claim 4, wherein the basic ignition timing is corrected by the ignition timing correction value determined from the computing parameter when the computing parameter has changed beyond at least a predetermined rate of change.

11. The controller of claim 3, wherein accelerated operation of the engine is regarded as transitional operation of the engine, and during the acceleration of the engine, the basic ignition timing obtained by the basic ignition timing setting means is corrected by the ignition timing correction value determined by the ignition timing correction value calculating means on the basis of the computing parameter which has been calculated by the computing parameter calculating means.

12. The controller of claim 11, wherein the accelerated operation of the engine is detected when the opening speed of an associated throttle valve is at least a predetermined value.

13. The controller of claim 11, wherein when the opening speed and opening rate of the throttle valve are detected to be at least the predetermined value and close to full opening, respectively, the basic ignition timing is corrected by the ignition timing correction value determined from the computing parameter.

14. The controller of claim 13, wherein the basic ignition timing is corrected by the ignition timing correction value determined based on the computing parameter and the quantity of state of the operation parameter during full opening of the throttle valve.

15. The controller of claim 14, wherein a latest ignition timing correction value $\Delta A$ determined by the ignition timing calculating means is expressed by the following formula:

$$\Delta A = \lambda[\{(\beta/\gamma)(A/N_s)N\}-\theta]$$

in which:
$\theta$: data indicative of the computing parameter, said data corresponding to the difference between the wall temperature of the combustion chamber and the coolant temperature;
N: engine revolution number;
$A/N_s$: intake air volume per revolution of the engine during steady state operation with the throttle valve being in a fully opened position, the quantity of state of the operation parameter being determined by the product of $A/N_s$ and N;
$\lambda,\beta,\gamma$: constants.

16. The controller of claim 15, wherein the constant $\lambda$ is determined in accordance with at least one of the engine revolution number and the coolant temperature.

17. The controller of claim 3, wherein while the engine is cold, the corrective control of the ignition timing based on the ignition timing correction value determined by the ignition timing correction value calculating means is inhibited.

18. The controller of claim 3, wherein the variable indicative of the quantity of combustion energy of the engine is the volume of intake air or an injection quantity of fuel.

19. The controller of claim 3, wherein the computing parameter calculating means calculates the computing parameter on the basis of the product of engine load information and engine revolution number information.

20. The controller of claim 19, wherein the engine load information is information on the volume of intake air per revolution of the engine.

* * * * *